(12) United States Patent
Neubauer et al.

(10) Patent No.: US 10,596,648 B2
(45) Date of Patent: Mar. 24, 2020

(54) INTERNAL THREAD CHASE

(71) Applicant: Snap-on Incorporated, Kenosha, WI (US)

(72) Inventors: Kyle M. Neubauer, Milwaukee, WI (US); William T. Sharp, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/711,721

(22) Filed: Sep. 21, 2017

(65) Prior Publication Data
US 2018/0318950 A1 Nov. 8, 2018

Related U.S. Application Data

(60) Provisional application No. 62/503,116, filed on May 8, 2017.

(51) Int. Cl.
*B23G 5/14* (2006.01)
*B23G 9/00* (2006.01)

(52) U.S. Cl.
CPC ............. *B23G 9/009* (2013.01); *B23G 5/14* (2013.01); *B23G 2200/10* (2013.01); *B23G 2210/04* (2013.01)

(58) Field of Classification Search
CPC ............ B23G 2200/08; B23G 2200/10; B23G 2200/12; B23G 1/46; B23G 5/14; B23G 9/009; Y10T 408/8588; Y10T 408/9048
USPC .......................................... 470/198, 200–203
See application file for complete search history.

(56) References Cited

U.S. PATENT DOCUMENTS

| 189,889 | A | | 4/1877 | Douglas |
| 391,777 | A | | 10/1888 | Buck |
| 758,038 | A | * | 4/1904 | Allendorfer et al. ..... B23G 5/14 |
| | | | | 470/203 |
| 1,075,753 | A | | 10/1913 | Bastian |
| 1,344,113 | A | | 6/1920 | Buckius |
| 1,509,438 | A | * | 9/1924 | Miller ...................... B23G 5/14 |
| | | | | 408/169 |

(Continued)

FOREIGN PATENT DOCUMENTS

| CN | 2775367 | 4/2006 |
| CN | 1255239 | 5/2006 |

(Continued)

OTHER PUBLICATIONS

United Kingdom Combined Search and Examination Report for Application No. GB1805203.5 dated Sep. 28, 2018, 5 pages.

(Continued)

*Primary Examiner* — Pradeep C Battula
(74) *Attorney, Agent, or Firm* — Seyfarth Shaw LLP

(57) ABSTRACT

Disclosed is a thread chase or tap capable of being inserted past damaged threads of a female threaded coupling and then rotated back to repair the damaged threads. The thread chase can be selectively expanded to engage chase blocks having cutting teeth against threads. Thereafter, a user can rotate the thread chase in a direction sufficient to cause the thread chase to move axially out of the female threaded coupling. Upon doing so, the chase blocks can be pushed outwardly and engage undamaged threads, and rotated so as to move upward and repair damaged threads.

6 Claims, 3 Drawing Sheets

(56) References Cited

U.S. PATENT DOCUMENTS

| | | | |
|---|---|---|---|
| 1,877,251 A | | 9/1932 | Miller |
| 2,060,949 A | | 11/1936 | Pace |
| 2,811,067 A | * | 10/1957 | Greer ................. B25B 13/5083 |
| | | | 81/445 |
| 4,097,180 A | | 6/1978 | Kwieraga |
| 5,480,272 A | * | 1/1996 | Jorgensen ............... B23G 5/14 |
| | | | 408/222 |
| 9,079,262 B2 | | 7/2015 | Dilanchian |
| 9,227,256 B2 | | 1/2016 | Emerson |

FOREIGN PATENT DOCUMENTS

| | | |
|---|---|---|
| CN | 201198054 | 2/2009 |
| CN | 201340735 | 11/2009 |
| CN | 105003211 | 10/2015 |
| CN | 205032819 | 2/2016 |
| DE | 9101746 | 3/1992 |
| EP | 1095724 | 5/2001 |
| JP | 2009148886 | 7/2009 |

OTHER PUBLICATIONS

CN Office Action for Application No. 201810434206.3 dated Jul. 26, 2019, 7 pages.
Canadian Office Action for Application No. 3,001,360 dated Jun. 18, 2019, 3 pages.
Chinese Office Action for Application No. 2018104342063 dated Jul. 26, 2019, 7 pages.

\* cited by examiner

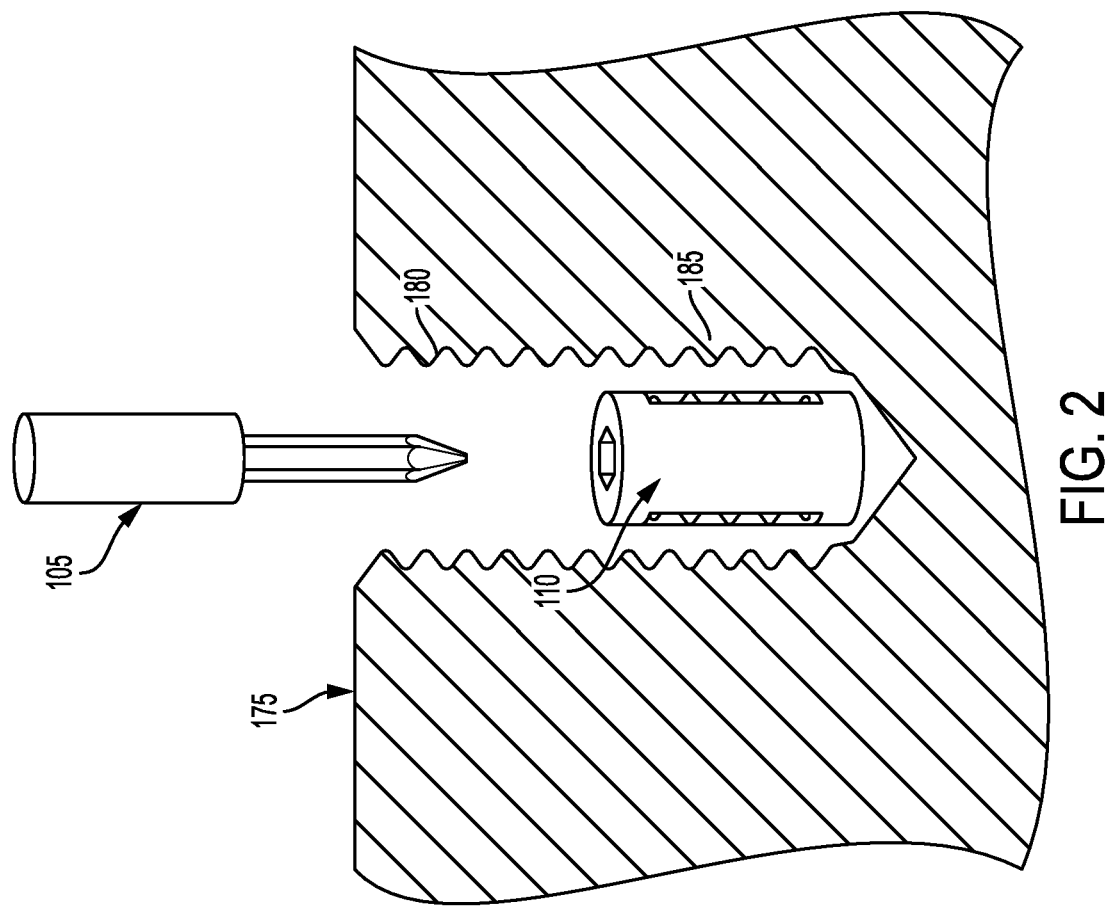

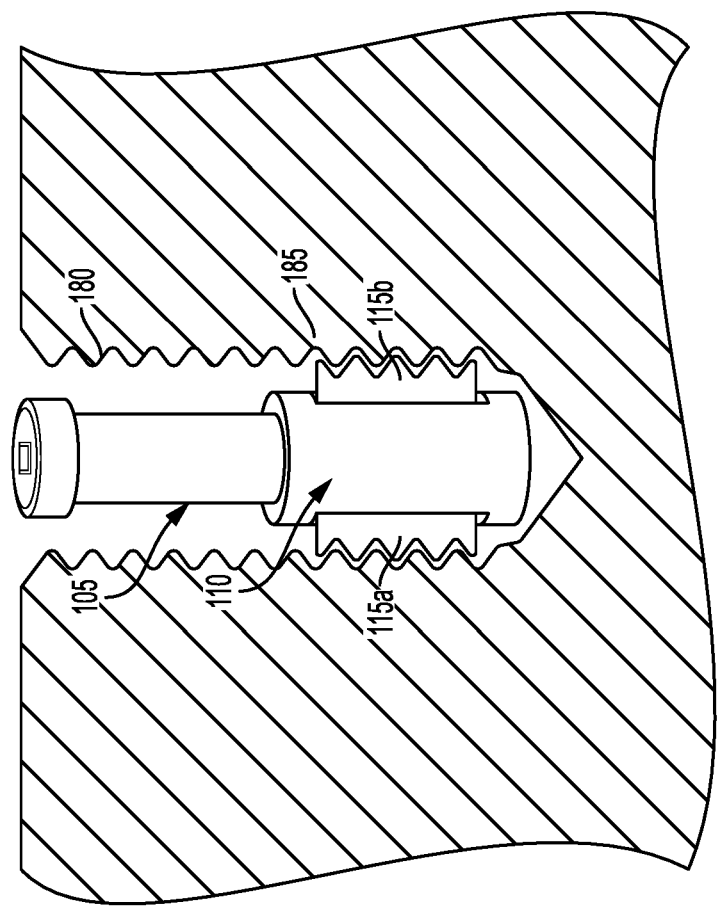

INTERNAL THREAD CHASE

RELATED APPLICATIONS

The present application is related to, and claims priority to, provisional patent application Ser. No. 62/503,116, filed May 8, 2017, the disclosure of which is incorporated herein.

TECHNICAL FIELD OF THE INVENTION

The present invention relates generally to threaded connection repair. More particularly, the present invention relates to an internal thread chase capable of being inserted past damaged threads and retracted and then rotated and returned to repair the damaged threads.

BACKGROUND OF THE INVENTION

Threaded connections are a common structure used in fastening two objects together. External or threads are typically found on, for example, male components, such as a bolt, screw or on pipes. These threads either engage a working material directly, such as a board of wood and grip the wood directly to fasten the wood to another object, or a corresponding female component that has threads, such as a threaded coupling or nut. With a threaded connection, the threads of the male component cooperatively engage the threads of the female component by relative rotation. In both circumstances, and with threads in general, rotation of the male or female components relative to each other results in coupling and tightening of the threaded connection, or decoupling and loosening of the thread, depending on the direction of rotation. Typically, clockwise rotation causes tightening, and counterclockwise rotation causes loosening.

During use, and especially over time, threads of either the male or female components can become damaged, such as being "stripped" and therefore difficult or impossible to use as intended. For example, threads of the female component can become warped by inexact fittings of threads of the male component. Once damaged, the threads of the male and female components cannot matingly engage, and thus do not either tighten or loosen.

Thread chases or taps exist for repairing damaged threads of female components. Thread chases typically involve a device having teeth or other cutting elements that are inserted into the female component and is then rotated to cut into the thread material, such as, for example, a metal, to regain the structure of the threads and thus repair the threads. However, many thread chases are inserted into the female component and begin at the outermost damaged threads, and rotate until they are within the undamaged threads. Typically, this is done with clockwise rotation, as with a tap. However, positioning the tap in this fashion can become difficult because the initial threads are often damaged, thus leading to misalignment, and are therefore more difficult to insert the thread chase into and thus create a proper realignment of the threads.

Other thread chases allow the cutting members to insert past the damaged threads to undamaged, engage the undamaged threads for alignment, and then retract backwards (such as counterclockwise) to chase the threads that were damaged. However, such thread chases are often difficult to push past the undamaged threads due to their bulky nature and outward cutting surfaces. These thread chases can also damage the undamaged threads during insertion unless the thread chase is thin and can move within the opening without abutting the threads until so desired.

SUMMARY OF THE INVENTION

The present invention broadly comprises a thread chase having chase blocks with cutting teeth that are inserted into a female threaded component past damaged threads to an area of undamaged threads. The chase blocks can be selectively extended outwardly, such as with a corresponding hex drive that is inserted into an opening in a cage, to align with the undamaged threads and then rotated to engage and recut the damaged thread area. Upon doing so, the chase blocks can be pushed outwardly and engage undamaged threads, and rotated so as to move upwardly and repair damaged threads.

In an embodiment, the present invention broadly comprises a thread chase including a drive having a shaft and an input, with the shaft having a drive cross-section. The thread chase can also include a cage having a body and an opening with a cross-section complementary to the cross-section of the drive. The body can include a slot extending radially from the opening that communicates with the opening with an external periphery of the cage. Further included is a chase block having cutting teeth adapted to engage undamaged threads and cut or repair damaged threads of a female threaded component. The chase block is further configured to be disposed outwardly through the slot when the drive is inserted into the opening.

In another embodiment, the present invention broadly comprises a method of repairing or cutting threads including providing a thread chase having a drive with a shaft and an input, where the shaft can have a drive cross-section. The cage can include a body and an opening with a cross-section complementary to the cross-section of the drive, and a slot extending radially from the opening to communicate the opening with an external periphery of the cage. A chase block can include cutting teeth adapted to engage and repair threads of a female threaded component. The method can further include inserting the cage into a female threaded component having damaged threads, inserting the drive through the opening, thereby causing the chase block to move radially outward within the slot and cause engagement of the cutting teeth with undamaged threads for alignment, rotating the thread chase within the female threaded component in a rotational direction (such as counterclockwise) which causes the thread chase to move axially outward relative to the female threaded component, and continuing to rotate the thread chase so as to chase, repair or recut the damaged threads in the female threaded component.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 2 is a side elevation view of an embodiment of the present invention inserted into a typical female threaded component, shown in cross-section, and with the drive disengaged from the cage.

FIG. 3 is a side elevation view of an embodiment of the present invention inserted into a typical female threaded component, shown in cross-section, and with the drive engaged with the cage to cause the cutting teeth to engage the threads.

DETAILED DESCRIPTION OF THE EMBODIMENTS

Figure 1:
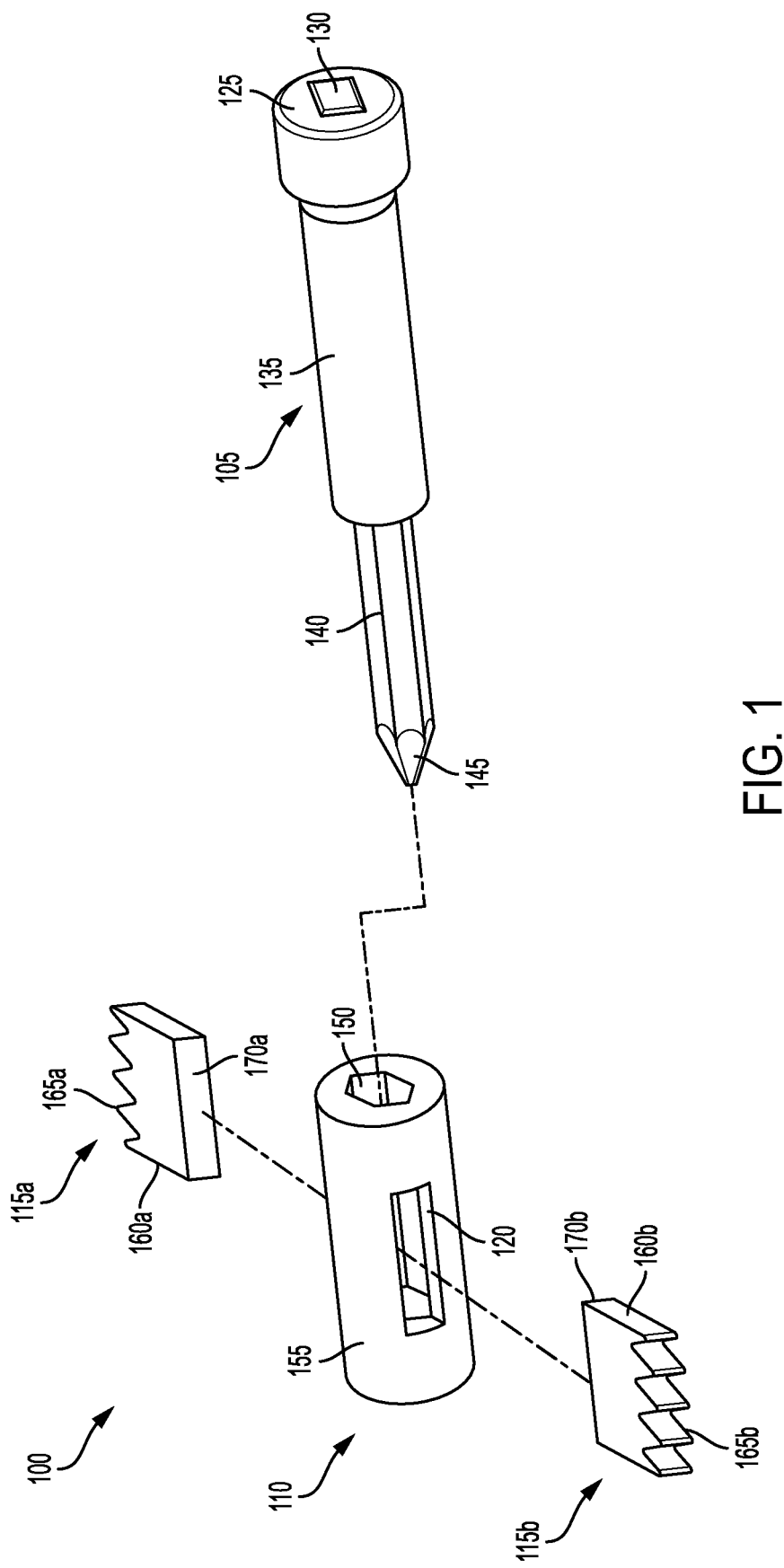
FIG. 1 is an exploded perspective side view of a thread chase according to at least some embodiments of the present invention.

While this invention is susceptible of embodiments in many different forms, there is shown in the drawings, and will herein be described in detail, embodiments, including a preferred embodiment, of the invention with the understanding that the present disclosure is to be considered as an exemplification of the principles of the invention and is not intended to limit the broad aspect of the invention to any one or more embodiments disclosed herein. As used herein, the term "present invention" is not intended to limit the scope of the claimed invention and is instead a term used to discuss exemplary embodiments of the invention for explanatory purposes only.

The present invention broadly comprises a thread chase or tap capable of being inserted past damaged threads of a female threaded component, have cutting teeth that radially expand to engage undamaged threads to align the thread chase, and then rotate the thread chase so as to repair or recut the damaged threads. The thread chase can include chase blocks having cutting teeth that can be selectively inserted into undamaged threads upon insertion of a drive into a female threaded component. Thereafter, the user can rotate the thread chase (such as in a counterclockwise direction) to repair or recut the damaged threads located above the undamaged threads. Upon doing so, the chase blocks can be pushed outwardly causing the cutting teeth to engage undamaged threads for alignment and gripping, and rotated so as to move upward and repair or recut damaged threads.

Referring to FIG. 1, a thread chase or tap 100 can include a drive 105 that can be inserted into a cage 110 to cause chase blocks 115a, b to expand outwardly to cause cutting teeth to engage, e.g., undamaged threads. The chase blocks 115a,b can be slidably disposed within slots 120 of the cage 110 and, upon insertion of the drive 105, can move radially outward based on the presence of the drive 105.

The drive 105 can include a head 125 having an input 130 for receiving a tool or other device, for example, an Allen wrench. The head 125 can be coupled to a base 135, which can lead to a shaft 140 having a point 145. Upon receiving the tool, the input 130 can allow the transfer of torque from the tool to the drive 105 so as to apply the torque to the cage 110. For example, a user could insert the drive 105 into the cage 110 by inserting the shaft 140 into the opening 150 with the guide of the point 145. The shaft 140 can be a size and shape complementary to that of the opening 150 to allow a receiving of the shaft 140 and the opening 150. For example, and without limitation, the shaft 140 can have a hexagonal cross-section, and the opening 150 can have a cooperative size and shape hexagonal cross-section to allow removable insertion of the drive 105 into the cage 110 while simultaneously allowing rotation of the drive 105 to cause rotation of the cage 110. A user can then insert a tool into the input 130 to rotate the drive 105 within the cage 110 and thereby rotate the thread chase 100 from the damaged threads to the undamaged threads, thereby repairing or recutting the damaged threads.

The cage 110 can include a body 155 with the slot 120 and opening 150 defined within it. The chase blocks 115a,b can insert into the slot 120 within the body 155 and remain held within the body 155 due to their size and shape. For example, the chase blocks 115a,b can include a chase body 160a,b having cutting teeth 165a,b at one end for engaging threads and repairing damaged threads, and a rear face 170a,b at the opposite face of the chase body 160a,b. The rear face 170a,b can have larger cross-sectional area than that of the slot 120, or can otherwise be larger than the slot in any dimension, to avoid the chase block 115a,b from escaping through the slot 120 during use or while being stored. Similarly, chase body 160a,b can have a trapezoidal or other cross-sectional shape to allow the chase block 115a,b to stay within the cage 110. The first chase block 115a can abut the other chase block 115b to prevent the chase blocks 115a,b from escaping out of the other end of the slot 120 internal to the cage 110. Alternately, the thread chase 100 can include only one chase block 115a,b and the chase block 115a,b can remain within the slot 120 in any know manner. Still alternately, the number of chase blocks 115a,b need not be one or two and can be any number. In an embodiment, the chase blocks 115a,b can be biased inwardly within the cage 110 by any known means, such as, for example, a spring.

The cutting teeth 165a,b of the chase block 115a,b can be structured to engage threads of a female threaded component to chase the threads. For example, the chase block 115a,b can include a specific size of teeth 165a,b corresponding to a specific thread width. The chase blocks 115a,b can then be changed with chase blocks 115a,b that have differently sized cutting teeth 165a,b to account for different sized threads. For example, the cage 110 can include two halves that couple to one another in a clamshell housing arrangement. The chase blocks 115a,b can then be replaced with different chase blocks to chase different sized threads by unhinging the clamshell housing of the cage 110, removing the chase blocks 115a,b and replacing with different sized chase blocks 115a,b. Alternately, the cage 110 as an assembly can be sized for a specific thread size, and a user can choose from various different cages 110 to chase threads of different sizes.

In an embodiment, the chase blocks 115a,b each includes a rear face opposite the cutting teeth, where the rear face has a cross-sectional area larger than a cross-sectional area of the slot to prevent the chase blocks 115a,b from moving completely through the respective slots.

Referring to FIGS. 2 and 3, a process for inserting a thread chaser 100 into a female threaded component 175 having threads 180, 185 and repairing the threads 180, 185 is illustrated. As shown, the cage 110 can be inserted into female threaded component having undamaged threads 180 and damaged threads 185 below the undamaged threads 180. After being inserted, the cage 110 can receive the drive 105 by the user inserting the point 145 of the drive into the opening 150 and pushing inwardly into the opening 150. In doing so, as shown in FIGS. 2 and 3, the drive 105 can push the chase blocks 115a,b radially outward through the slot 120. The user can then use a tool to rotate the thread chase 100 by inserting the tool into the input 130 and rotating so as to retract the thread chase 100 from the female threaded component, thus repairing or recutting the damaged threads. For example, a user can rotate counterclockwise to rotate the thread chase 100 outward from the female threaded coupling in a typical right-handed thread configuration. The thread chase 100 will then cause the cutting teeth 165a,b to rotate first within the undamaged threads 185, causing alignment of the cutting teeth, and then chase the damaged threads 180 so as to repair or recut them. The thread chase 100 can then be removed from the female threaded component by continuing the rotation or alternately by removing the drive 105 from the opening 150 which causes or allows the chase blocks 115a,b to retract inwardly into the tool. In an embodiment, a biasing structure or component, such as, for example a spring or elastic member, is used to bias the chase blocks 115a,b inwardly, wherein insertion of the drive 105 into opening 150 causes radial outward movement of the chase blocks 115a,b against the bias.

The compact nature of the thread chase 100 allows it to be inserted into more threaded areas, compared to prior art thread chases. For example, the chase blocks 115a,b can remain within the cage 110 until it is necessary to deploy the chase blocks 115a,b and chase threads of a female threaded component. A user can therefore use the thread chase of the present invention with a wider variety of female threaded components.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A method of chasing threads of a female threaded coupling comprising:
    providing a thread chase having a drive with a shaft and an input, the shaft having a drive cross-section, a cage having a body and an opening with a cross-section complementary to the cross-section of the drive, and a slot extending radially from the opening so as to communicate the opening with an external periphery of the cage, and a chase block having cutting teeth adapted to engage undamaged threads of the female threaded coupling and repair or recut damaged threads of the female threaded coupling, the chase block further including a rear face opposite the cutting teeth, wherein the rear face has a cross-sectional area larger than a cross-sectional area of the slot to prevent the chase block from moving completely through the slot;
    inserting the cage into female threaded coupling;
    inserting the drive through the opening, thereby causing the chase block to move radially outward within the slot to cause the cutting teeth to engage the threads of the female threaded coupling;
    rotating the thread chase within the threads in a rotational direction that causes the thread chase to move axially relative to the female threaded coupling; and
    continuing to rotate the thread chase so as to chase the threads of the female threaded coupling.

2. The method of claim 1, wherein the step of rotating the thread chase includes inserting a tool into the input disposed on the drive and rotating the thread chase.

3. A tool for repairing or recutting threads of a female threaded component comprising:
    a drive having a shaft and an input, the shaft having a drive cross-section;
    a cage having a body and an opening with a cross-section complementary to the cross-section of the drive, the body further including a slot extending radially from the opening causing the opening to communicate with an external periphery of the cage;
    a chase block having cutting teeth disposed thereon, wherein the cutting teeth are adapted to engage undamaged threads of the female component and repair or recut damaged threads of the female component, the chase block further adapted to be moved outwardly through the slot when the drive is moved longitudinally in the opening, and the chase block further including a rear face opposite the cutting teeth, wherein the rear face has a cross-sectional area larger than a cross-sectional area of the slot to prevent the chase block from moving completely through the slot.

4. The tool of claim 3, wherein the chase block is biased inwardly to be disposed within the cage.

5. The tool of claim 3, wherein the cross-section of the opening of the cage and the cross-section of the drive are each hexagonal.

6. The tool of claim 3, wherein the drive includes a point at a first end, and the input is disposed on a head located at a second end opposite the first end.

* * * * *